(12) United States Patent
Murrah

(10) Patent No.: US 9,483,717 B2
(45) Date of Patent: Nov. 1, 2016

(54) METHOD AND APPARATUS FOR STOCKING AND/OR RESTOCKING AN ITEM

(71) Applicant: SYMBOL TECHNOLOGIES, INC., Holtsville, NY (US)

(72) Inventor: Judith A. Murrah, St. James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 629 days.

(21) Appl. No.: 13/655,908

(22) Filed: Oct. 19, 2012

(65) Prior Publication Data

US 2014/0110478 A1 Apr. 24, 2014

(51) Int. Cl.
*G06K 19/00* (2006.01)
*G06K 17/00* (2006.01)
*G06Q 10/08* (2012.01)

(52) U.S. Cl.
CPC ......... *G06K 17/0029* (2013.01); *G06Q 10/087* (2013.01); *G06Q 10/0833* (2013.01); *G06K 2017/0051* (2013.01)

(58) Field of Classification Search
USPC ............. 235/375, 385.487, 492; 340/10, 572
See application file for complete search history.

(56) References Cited

U.S. PATENT DOCUMENTS

| | | |
|---|---|---|
| 6,601,764 B1 | 8/2003 | Goodwin, III |
| 6,844,821 B2 | 1/2005 | Swartzel et al. |
| 7,152,040 B1 | 12/2006 | Hawthorne et al. |
| 7,603,291 B2 | 10/2009 | Raiyani et al. |
| 7,760,095 B2 | 7/2010 | Murrah |
| 7,775,430 B2 | 8/2010 | Lin |
| 7,782,194 B2 | 8/2010 | Stawar et al. |
| 8,115,623 B1 | 2/2012 | Green |
| 8,126,198 B2 | 2/2012 | Batt |
| 8,222,999 B2 | 7/2012 | Hiramatsu et al. |
| 2002/0180588 A1 | 12/2002 | Erickson et al. |
| 2005/0242958 A1 | 11/2005 | Lyon et al. |
| 2007/0182555 A1 | 8/2007 | Walker |
| 2008/0059297 A1 | 3/2008 | Vallier et al. |
| 2010/0060452 A1 | 3/2010 | Schuster et al. |
| 2010/0219953 A1* | 9/2010 | Bloy .......................... 340/572.1 |

FOREIGN PATENT DOCUMENTS

WO 03061366 A2 7/2003
WO WO 2012109194 A1 * 8/2012

OTHER PUBLICATIONS

International Search Report and Written Opnion dated Feb. 24, 2014 in counterpart application PCT/US2013/064197.

* cited by examiner

*Primary Examiner* — Matthew Mikels

(57) ABSTRACT

A method and apparatus are provided for stocking and/or restocking an item. During operation, an RFID reader will determine items to be stocked/restocked. This determination may be made by performing a first scan and determining all items within range. Once determined, the RFID reader will continuously scan items that are within range. When the RIFD reader encounters an additional item that is similar to an item to be stocked/restocked, a notification is provided to a user.

14 Claims, 4 Drawing Sheets

US 9,483,717 B2

METHOD AND APPARATUS FOR STOCKING AND/OR RESTOCKING AN ITEM

FIELD OF THE DISCLOSURE

The present invention relates generally to restocking an item, and in particular to a radio frequency identification (RFID) reader used for stocking and/or restocking an item, and a method for using an RFID reader for stocking and/or restocking an item.

BACKGROUND

One of the more time-consuming tasks facing owners of large inventories is returning moved items to a correct location. For example, it may take hours for a store clerk to restock a cart full of items to the right store shelf. It would be beneficial if a method and apparatus for restocking an item existed that greatly reduced the amount of time necessary to restock the item.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
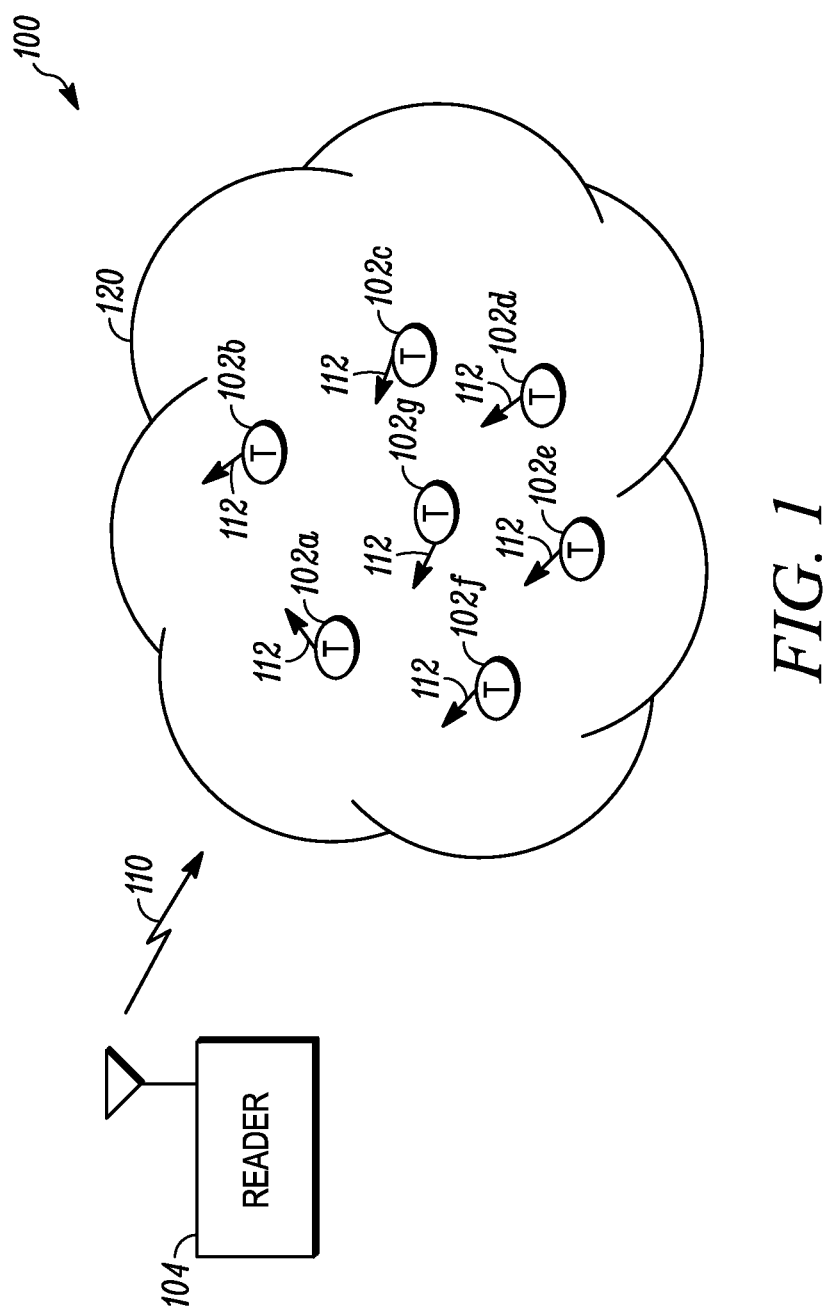
FIG. 1 is a system diagram illustrating an environment where RFID reader devices communicate with an exemplary population of RFID tags, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In order to address the above-mentioned need, a method and apparatus are provided for stocking and/or restocking an item. During operation, an RFID reader will determine items to be stocked/restocked. This determination may be made by performing a first scan and determining all items within range. Once determined, the RFID reader will continuously scan items that are within range. When the RIFD reader encounters an additional item that is similar to an item to be stocked/restocked, a notification is provided to a user.

The above technique may be utilized to greatly reduce an amount of time necessary to stock and/or restock items. For example, consider a cart full of 100 items that needs to be restocked. An initial scan may be made by an RFID reader to determine the identities for all items in cart 301. As a user walks cart 301 up and down the aisles, the RFID reader announces when an item in cart 301 matches an item on the shelf. Thus, as items on the shelves come into "view", the items are analyzed by the RIFD reader, and a determination is made whether or not the item that came into view matches any of the items in cart 301. When a match is determined, an identification for the matched item is provided to the user along with an indication that the matched item is nearby. The item can then be restocked at the appropriate location.

It should be noted that the following description describes an RFID reader that aides in stocking or restocking an item. During the description, the term stocking and restocking may be used interchangeably. Thus, the techniques provided below may be given with respect to "restocking" an item, however, the same technique may be utilized to initially stock an item. Additionally, while the description that follows may provide an RFID reader in use, for example a shopping cart, it is envisioned that the RFID reader may be handheld, attached to a cart, attached to a rack, attached to a user, or physically combined or attached with any number of restocking aides (e.g., carts, racks, handheld baskets, . . . , etc.)

Before describing embodiments of the present invention in detail, it is helpful to describe an example RFID communications environment in which the invention may be implemented. RFID tags are now widely used to mark inventory and track various products. RFID tags generally transmit to a handheld or robotically controlled reader device a radio frequency (RF) signal that includes product information. RFID tags generally include an integrated circuit for storing and processing information, a transceiver for transmitting and receiving RF signals, and an antenna. Some RFID tags are active RFID tags and include their own battery power source. Passive RFID tags do not have their own power source and require receiving a power signal from a reader device to operate. For interrogating passive RFID tags, a reader generally transmits a continuous wave (CW) or modulated RF signal to a tag. The tag receives the signal, and responds by modulating the signal and then "backscattering" an information response signal to the reader. The reader device receives the response signal from the tag, and the response signal is demodulated, decoded and further processed.

FIG. 1 is a system diagram illustrating an environment 100 where RFID reader device 104 communicates with an exemplary population 120 of RFID tags 102. As shown, the population 120 of tags includes seven tags 102a-102g. A population 120 may include any number of tags 102.

As shown in FIG. 1, reader 104 transmits an interrogation signal 110 having a carrier frequency to the population of tags 120. Reader 104 typically operates in one or more of the frequency bands allotted for this type of RF communication. For example, frequency bands of 902-928 MHz and 2400-2483.5 MHz have been defined for certain RFID applications by the United States Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternately absorbing and reflecting signal 110 is referred to herein as backscatter modulation. Reader 104 receives and obtains data from response signals 112, such as an identification number of the responding tag 102. In the embodiments described herein, a reader may be capable of communicating with tags 102 according to any suitable communication protocol, including Class 0, Class 1, Electronic Product Code (EPC) Gen 2, other binary traversal protocols and slotted aloha protocols, any other protocols mentioned elsewhere herein, and future communication protocols.

Figure 2:
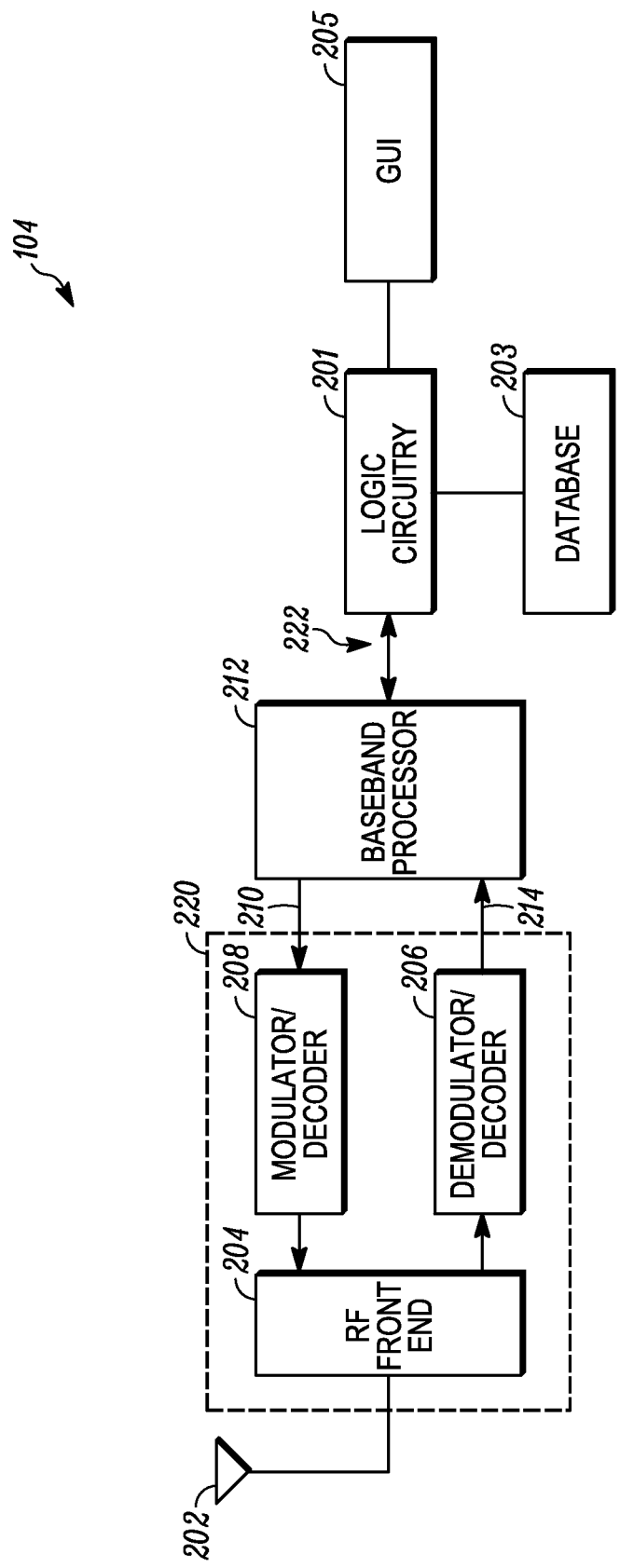
FIG. 2 is a block diagram illustrating some elements of an RFID reader device, according to an embodiment of the present invention.

FIG. 2 is a block diagram of an example RFID reader 104. Reader 104 includes an antenna 202, a receiver and transmitter portion 220 (also referred to as transceiver 220), a baseband processor 212, logic circuitry 201, database 203, and graphical user interface (GUI) 205. These components of reader 104 may include software, hardware, and/or firmware, or any combination thereof, for performing their functions.

As shown in FIG. 2, baseband processor 212 and logic circuitry 201 communicate with each other via a communication link 222. Logic circuitry 201 is utilized to maintain a list of items to be restocked within database 203 (standard random access memory). Logic circuitry 201 comprises a digital signal processor (DSP), general purpose microprocessor, a programmable logic device, or application specific integrated circuit (ASIC) and is utilized to access and control all components of reader 104. When aiding in restocking, logic circuitry 201 provides an interrogation request 210 periodically to transceiver portion 220 (optionally through baseband processor 212). Baseband processor 212 processes the data of interrogation request 210 prior to being sent to transceiver portion 220. Transceiver portion 220 transmits the interrogation request via antenna 202.

Reader 104 also includes antenna 202 for communicating with tags 102 and/or other readers 104. Antenna 202 may be any type of reader antenna known to persons skilled in the relevant art, including a vertical, dipole, loop, Yagi-Uda, slot, or patch antenna type. For description of an example antenna suitable for reader 104, refer to U.S. Pat. No. 7,551,140, titled "Low Return Loss Rugged RFID Antenna," issued 23 Jun. 2009.

Transceiver 220 receives a tag response via antenna 202. Transceiver 220 outputs a decoded data signal 214 generated from the tag response (optionally through baseband processor 212) to logic circuitry 201. Baseband processor 212 optionally processes the data of decoded data signal 214 prior to being sent to logic circuitry 201. At a minimum, this data comprises an identification of a product attached to the tag that is responding.

Graphical user interface 205 receives an input from a user to initiate a restocking process. In addition, in an embodiment, GUI 205 provides a way of conveying (e.g., displaying) restocking information to the user. In an embodiment, restocking information may be displayed to the user as a list of items needing to be restocked and whether or not a similar item (similar to any item on the list) has been detected by the RFID reader. In order to provide the above features (and additional features), GUI 205 may include a monitor, a keyboard, a mouse, a speaker, and/or various other hardware components to provide a man/machine interface. For example, where a speaker is used a "Geiger counter mode" may be utilized to help the user find the right item in the cart by allowing the sound to get louder or more frequent as the user waves the RFID reader around in the cart to find the item. In another embodiment, the GUI gives an audible indication of what portion of the cart the item to be restocked is located As shown in FIG. 2, transceiver portion 220 includes an RF front-end 204, a demodulator/decoder 206, and a modulator/encoder 208. These components of transceiver 220 may include software, hardware, and/or firmware, or any combination thereof, for performing their functions. An example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as is known to persons skilled in the relevant art(s).

As one of ordinary skill in the art will recognize, RFID reader 104 will only be able to detect RFID tags that may be within range of reader 104 (e.g., within the "field of view" of the RFID reader 104). This range may be adjusted slightly by varying an amount of power output by reader 104 (i.e., used to power an RFID tag), however, during typical operations, RFID reader 104 may only be capable of reading RFID tags within several meters of RFID reader 104. With this in mind, logic circuitry 201 (through GUI 205) will receive instructions to perform a restocking operation. In response, logic circuitry will instruct transceiver 220 to perform a first scan. Because of the short-range nature of RFID reader 104, the first scan will detect those items within a few meters of reader 104. When the restocking operation is initiated, logic circuitry 201 will treat items detected in the initial scan as items needing to be restocked.

Figure 3:
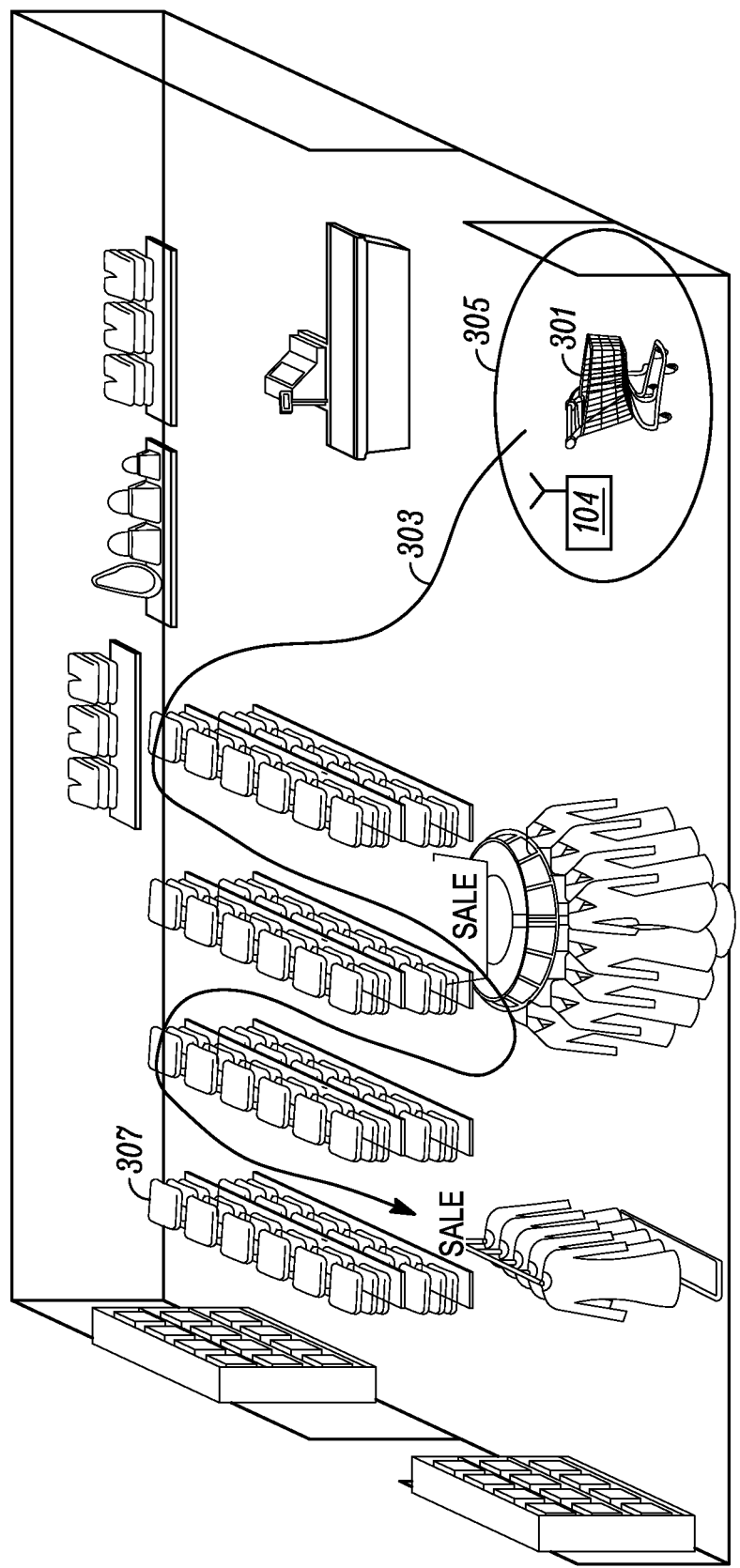
FIG. 3 illustrates the process of stocking or restocking an item.

As an example of the above consider FIG. 3. With reference to FIG. 3, it is assumed that there exists a plurality of items needing to be restocked (e.g., shopping cart 301 full of items needing to be restocked). A user (not shown) may then position reader 104 within a few meters of shopping cart 301 and initiate a restocking operation. Since cart 301 is within a few meters of reader 104, all items existing within cart 301 will be scanned and identified as items that need to be restocked.

Once the initial scan has taken place and the items needing to be restocked have been identified, logic circuitry 201 then stores a list of items needing to be restocked in database 203. Preferably, the list comprises an identification of the item along with an amount of that item (e.g., 6 pairs of men's Levis® Blue Jeans). This list may then be presented to the user through GUI 205.

It should be noted that one should take care to perform the initial scan away from appropriately-stocked inventory. In other words, because reader 104 will scan everything within a few meters, one should take care to initiate the restocking process when reader 104 is nowhere near RFID tags that do not need to be restocked, otherwise those tags may be read and identified as needing to be restocked.

As part of the restocking process, the user will maneuver cart 301 and reader 104 simultaneously throughout the store, for example, along path 303. Logic circuitry 201 will instruct transceiver 220 to periodically scan for RFID tags within range. It is assumed that the items needing to be restocked will always be within range until they are restocked and cart 301 and reader 104 move away from the restocked item. In other words, it is envisioned that a user operating reader 104 to restock items will maintain reader 104 within a few meters of all items that need to be restocked. Thus, the periodic scans performed by reader 104 should read all items currently needing to be restocked. During the periodic scans, once an item on the list is not detected, logic circuitry 201 removes the item from the list of items needing to be restocked.

As cart 301 proceeds along path 303, reader 104 will periodically transmit interrogation signals (e.g., once per second). During the periodic scanning, logic circuitry 201 will determine if an item similar to an item needing to be restocked has been encountered. For example, if there exists 6 pairs of men's Levis® Blue Jeans on the list of items to be restocked, logic circuitry 201 will determine if at least one additional pair of men's Levis® Blue Jeans has been encountered. If so, logic circuitry 201 will send a notification to the user (through GUI 205). This notification is designed to notify the user that a potential place for placing the 6 pairs of men's Levis® Blue Jeans has been encountered.

Thus, with the above in mind, assume that 6 pairs of men's Levis® Blue Jeans exists on the list of items that need to be restocked. During the restocking process, logic circuitry 201 determines that 35 pairs of men's Levis® Blue Jeans are now within range of reader 104. It can be assumed that reader 104 has now moved near the location where the 6 pairs of men's Levis® Blue Jeans should be restocked. A notification of this fact will be sent to the user. If during additional scans, reader 104 determines that no pair of men's Levis® Blue Jeans are detected (in the vicinity assumed to be the cart), then the 6 pairs of men's Levis® Blue Jeans are removed from the list of items needing to be restocked.

Figure 4:
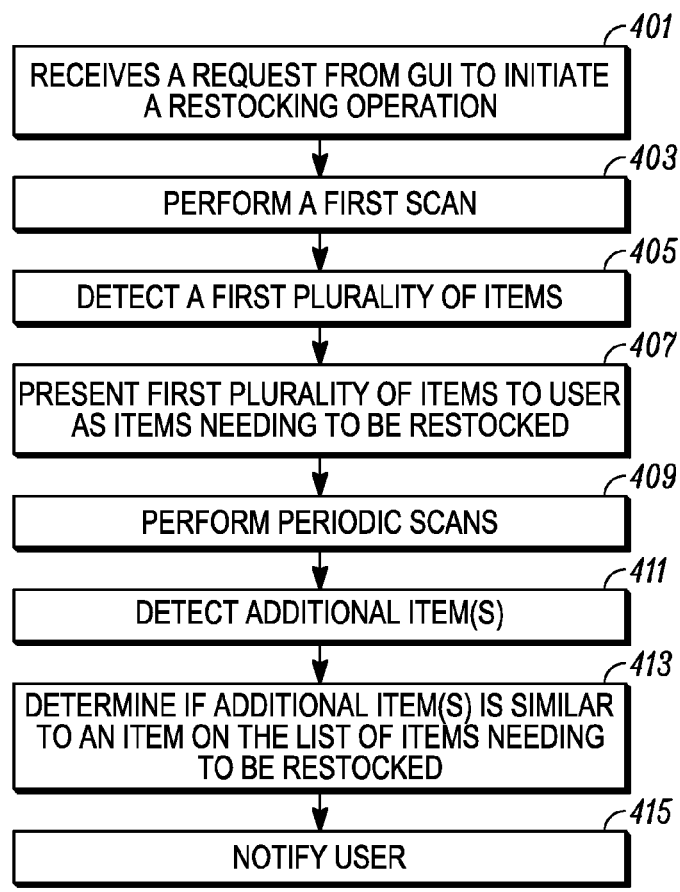
FIG. 4 is a flow chart showing operation of the reader of FIG. 1.

FIG. 4 is a flow chart showing operation of reader 104. The logic flow in FIG. 4 assumes a restocking operation will be executed by a user, however one of ordinary skill in the art will recognize that a stocking operation may be performed in a similar manner.

The logic flow begins at step 401 where logic circuitry 201 receives a request from GUI 205 to initiate a restocking operation. In response, logic circuitry 201 instructs transceiver 220 to perform a first scan (step 403). A first plurality of items are detected by logic circuitry 201 as a result of the first scan (step 405). As discussed above, the first plurality of items are treated as items needing to be restocked. At step 407, the items needing to be restocked are presented by logic circuitry 201 to the user through GUI 205 as a list of items needing to be restocked, and the list is also written to database 203. Thus, after step 407 logic circuitry 201 has detected all items needing to be restocked, and has provided these items to the user as a list. The list also exists in database 203.

As part of the restocking process, a user will transport the first plurality of items along with reader 104 throughout the premises. At step 409 logic circuitry 201 will instruct transceiver 220 to perform periodic scans (e.g., once per second) to determine if additional items are detected during the transport (i.e., items in addition to the first plurality of items). Thus, at step 409 at least a second scan is performed. As a result of the second scan, at least one additional item is detected (step 411). As discussed, the one additional item was not detected as the result of the first scan. For each additional item encountered, logic circuitry 201 will determine if the item is similar to an item on the list of items needing to be restocked (step 413). The user will be notified when the additional item(s) is similar to an item on the list of items needing to be restocked (step 415).

As discussed above, the initial scan should be performed in a first area 305 that is out of range from items that do not need to be restocked. This is done to ensure that only items needing to be restocked are added to the list of items needing to be restocked. In a similar manner the step of performing the second scan comprises the step of performing the second scan in a second area, where stocked items 307 exist (only one stocked item 307 is labeled in FIG. 3). As reader 104 and items to be restocked are transported down path 303 logic circuitry 201 may notify the user through GUI 205 regarding the identity of the additional items that come into view that match items on the list. This allows the user to be made aware of the potential place to restock the matched item.

As part of the restocking operation, items are removed from the list (and cleared from database 203) when the item is restocked. This task may be accomplished in one of many ways. One technique for accomplishing this task may be simply for the user to scan each item individually when it is removed from cart 301.

Figure 5:
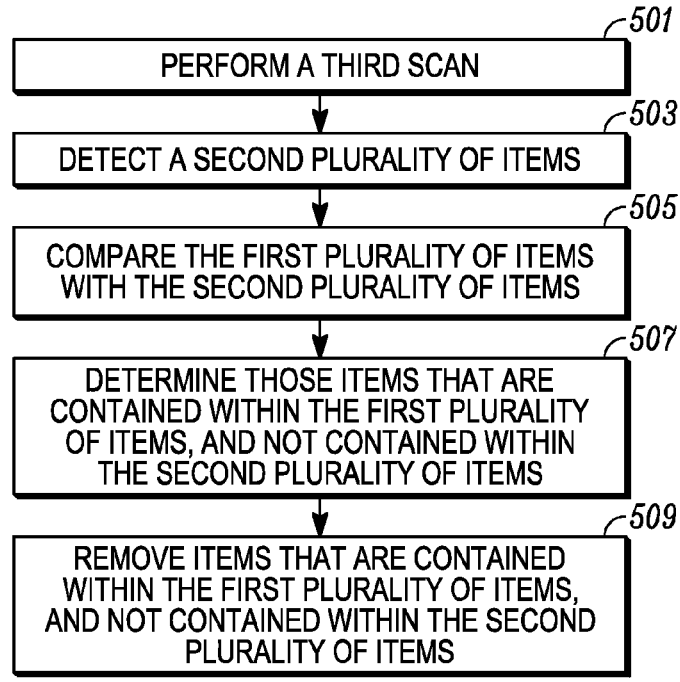
FIG. 5 is a flow chart showing operation of the reader of FIG. 1.

A second technique for accomplishing this task may be to have logic circuitry 201 detect when an item on the list is no longer within range. Thus, as the user restocks items, and cart 301 moves down path 303, the restocked item will move out of range and no longer read by scanner 104. Once this happens, logic circuitry 201 can remove the item from the list provided through GUI 205 and remove the item from database 203. With this in mind, FIG. 5 is a flow chart showing operation of reader 104 when an item is restocked. The logic flow begins at step 501 where logic circuitry instructs transceiver 220 to perform a third scan and detect a second plurality of items as a result of the third scan (step 503). As is evident, the items detected as a result of the third scan will be those stocked items within range of reader 104 (e.g., already existing on the shelf) along with those items needing to be restocked (e.g., items still in the cart). As reader 104 moves along path 303, reader 104 no longer detects restocked items that are out of range. Logic circuitry 201 then compares the first plurality of items to the second plurality of items (step 505) and determines those items that are contained within the first plurality of items, and not contained within the second plurality of items (step 507). Logic circuitry 201 then removes those items that are contained within the first plurality of items and not contained within the second plurality of items from the plurality of items needing to be stocked/restocked (step 509). More particularly, logic circuitry 201 accesses database 203 to remove those items from the list of items contained within database 203. Logic circuitry 201 also provides GUI 205 with the modified list. In other words, the original list presented to the user containing the first plurality of items to be restocked is updated to remove those items that are contained within the first plurality of items and not contained within the second plurality of items.

In the foregoing specification, specific embodiments have been described. However, one of ordinary skill in the art appreciates that various modifications and changes can be made without departing from the scope of the invention as set forth in the claims below. For example, while the above description was given with respect to "restocking" an item, one of ordinary skill in the art will recognize that the above-described technique may be utilized for any number of purposes. For example, the above-described technique may be utilized to initially stock items, or locate a single item at hand. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operating an RFID reader, the method comprising the steps of:

performing a first scan of a shopping cart or basket of items to be stocked or restocked;

detecting a first plurality of unstocked items existing in the shopping cart or basket as a result of the first scan;

performing a second scan of an area around the shopping cart or basket to detect stocked and unstocked items;

detecting at least one additional stocked item as a result of the second scan, wherein the one additional stocked item was not detected as the result of the first scan of the shopping cart or basket;

determining if the additional stocked item is similar to an unstocked item within the first plurality of items; and notifying the user when the additional stocked item is similar to an unstocked item within the first plurality of items.

2. The method of claim 1 further comprising the step of presenting the first plurality of unstocked items to a user as a list of items needing to be stocked or restocked.

3. The method of claim 2 further comprising the steps of:
performing a third scan;
detecting a second plurality of items as a result of the third scan;
comparing the first plurality of items to the second plurality of items;
determining those items that are contained within the first plurality of items, and not contained within the second plurality of items; and
removing those items that are contained within the first plurality of items and not contained within the second plurality of items from the first plurality of items presented to the user.

4. The method of claim 1 wherein the step of performing the first scan comprises the step of performing a first scan in a first area outside a range of stocked items in order to avoid detecting stocked items.

5. The method of claim 4 wherein the step of performing the second scan comprises the step of performing the second scan in a second area.

6. The method of claim 5 further comprising the step of notifying a user of an identity of the additional item.

7. A method for operating an RFID reader, the method comprising the steps of:
performing a first scan;
detecting a first plurality of unstocked items as a result of the first scan;
performing a second scan of both stocked and the first plurality of unstocked items;
comparing the stocked and unstocked items detected from the first and the second scans to determine at least one additional stocked item, wherein the one additional stocked item was not detected as the result of the first scan of the plurality of unstocked item(s);
determining if the additional stocked item is similar to an item within the first plurality of unstocked item(s);
notifying the user when the additional stocked item is similar to an item within the first plurality of unstocked item(s);
presenting the first plurality of unstocked item(s); to a user as a list of items needing to be stocked or restocked;
wherein the step of performing the first scan comprises the step of performing a first scan in a first area; and
wherein the step of performing the second scan comprises the step of performing the second scan in a second area.

8. The method of claim 7 further comprising the steps of:
performing a third scan;
detecting a second plurality of items as a result of the third scan;
comparing the first plurality of items to the second plurality of items;
determining those items that are contained within the first plurality of items, and not contained within the second plurality of items; and
removing those items that are contained within the first plurality of items and not contained within the second plurality of items from the first plurality of items presented to the user.

9. An RFID reader comprising:
a transceiver for performing a first scan and performing a second scan, wherein the first scan is of unstocked items and a second scan is of both stocked and the unstocked items, and wherein the first scan is performed in a first location and the second scan is performed in a second location;
logic circuitry detecting a first plurality of unstocked items as a result of the first scan and detecting at least one additional stocked item as a result of the second scan, wherein the one additional stocked item was not detected as the result of the first scan, the logic circuitry determining if the additional stocked item is similar to an item within the first plurality of unstocked items; and
a graphical user interface (GUI) notifying the user when the additional stocked item is similar to an item within the first plurality of unstocked items.

10. The RFID reader of claim 9 wherein the GUI additionally presents the first plurality of items to a user as a list of items needing to be stocked or restocked.

11. The RFID reader of claim 9 wherein:
the transceiver performs a third scan;
the logic circuitry detects a second plurality of items as a result of the third scan, compares the first plurality of items to the second plurality of items, determines those items that are contained within the first plurality of items, and not contained within the second plurality of items; and removes those items that are contained within the first plurality of items and not contained within the second plurality of items from the first plurality of items presented to the user.

12. The RFID reader of claim 9 wherein the first scan is performed in a first area.

13. The RFID reader of claim 9 wherein the second scan is performed in a second area.

14. The RFID reader of claim 9 wherein the GUI notifies a user of an identity of the additional item.

* * * * *